United States Patent [19]

Berry et al.

[11] Patent Number: 5,267,744
[45] Date of Patent: Dec. 7, 1993

[54] STROLLER WHEEL ASSEMBLY FOR BICYCLE TRAILER

[75] Inventors: Peter B. Berry; Bruce W. Creps; Donald A. George, all of Eugene; Edward F. Russell, Veneta, all of Oreg.

[73] Assignee: Burley Design Cooperative, Eugene, Oreg.

[21] Appl. No.: 882,852

[22] Filed: May 14, 1992

[51] Int. Cl.[5] .............................................. B62K 27/00
[52] U.S. Cl. ..................................... 280/204; 280/658
[58] Field of Search ............... 280/204, 203, 202, 293, 280/656, 657, 658, 87.03, 87.05

[56] References Cited

U.S. PATENT DOCUMENTS

| 909,297 | 1/1909 | Helgeson . | |
|---|---|---|---|
| 3,811,704 | 5/1974 | Gregoric | 280/293 X |
| 3,841,663 | 10/1974 | Proffit | 280/475 |
| 4,738,457 | 4/1988 | Conrad | 280/47.26 |
| 4,928,985 | 5/1990 | Nowlin | 280/204 |
| 5,064,209 | 11/1991 | Kurschat | 280/204 |
| 5,076,599 | 12/1991 | Lockett et al. | 280/204 |

FOREIGN PATENT DOCUMENTS 967288  10/1950  France ................................. 280/204

Primary Examiner—Joseph D. Pape
Attorney, Agent, or Firm—John F. Ingman

[57] ABSTRACT

A stroller wheel assembly is mounted on a bicycle trailer tongue to permit operation as either a trailer or a separate three-wheel stroller. A clamping member, attached to the tongue of the trailer, includes a boss which extends transversely outward. A mating socket is provided on a pivot member, the pivot member being attached to a fork which rotationally supports a wheel. The preferred shape of the boss and mating socket is an equilateral triangle. The triangular socket of the pivot member engages the triangular boss of the clamping member in two positions, one with the wheel in the down position for stroller use and the other with the wheel in a rearward position for bicycle trailer use. Centrally fixed to and extending outwardly from the triangular boss is a threaded member which acts as an axis for rotation of the pivot member between the two positions. A spring encloses the threaded member between the boss and the socket, thus biasing the boss out of the socket to facilitate relocation of the pivot member. The threaded member is inserted through an aperture formed in the socket, and a threaded knob, upon tightening, pulls the boss into the socket, thereby locking the wheel into the desired position. An upwardly inclined plate, attached to the front portion of the pivot member, physically interferes with and deflects the hitch when the wheel is in the down, stroller position, thus preventing inadvertant use of the wheel in the down, stroller position while hitched to the bicycle.

11 Claims, 2 Drawing Sheets

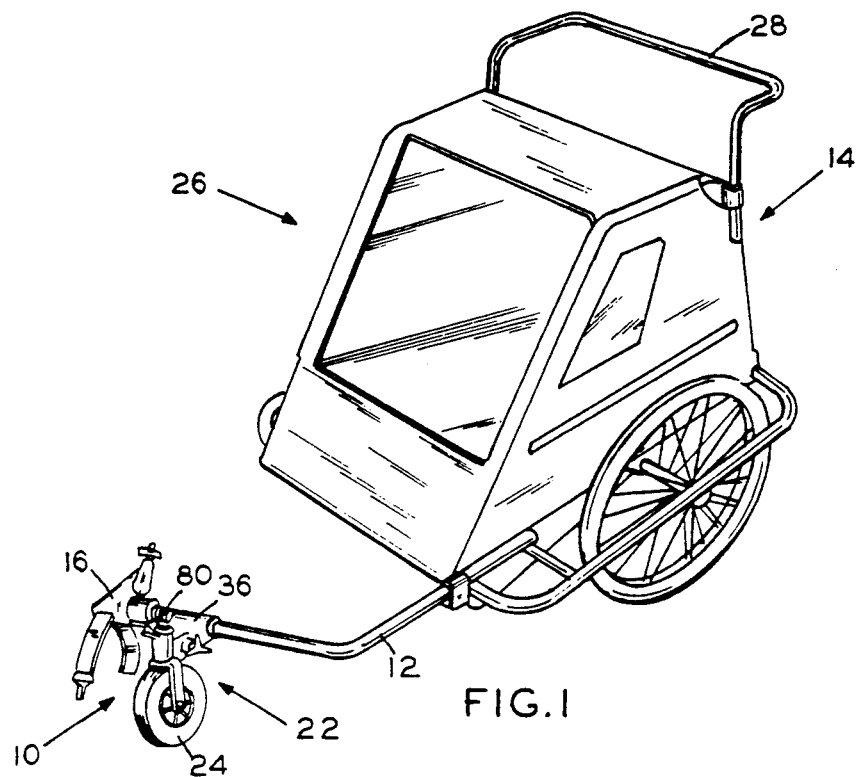
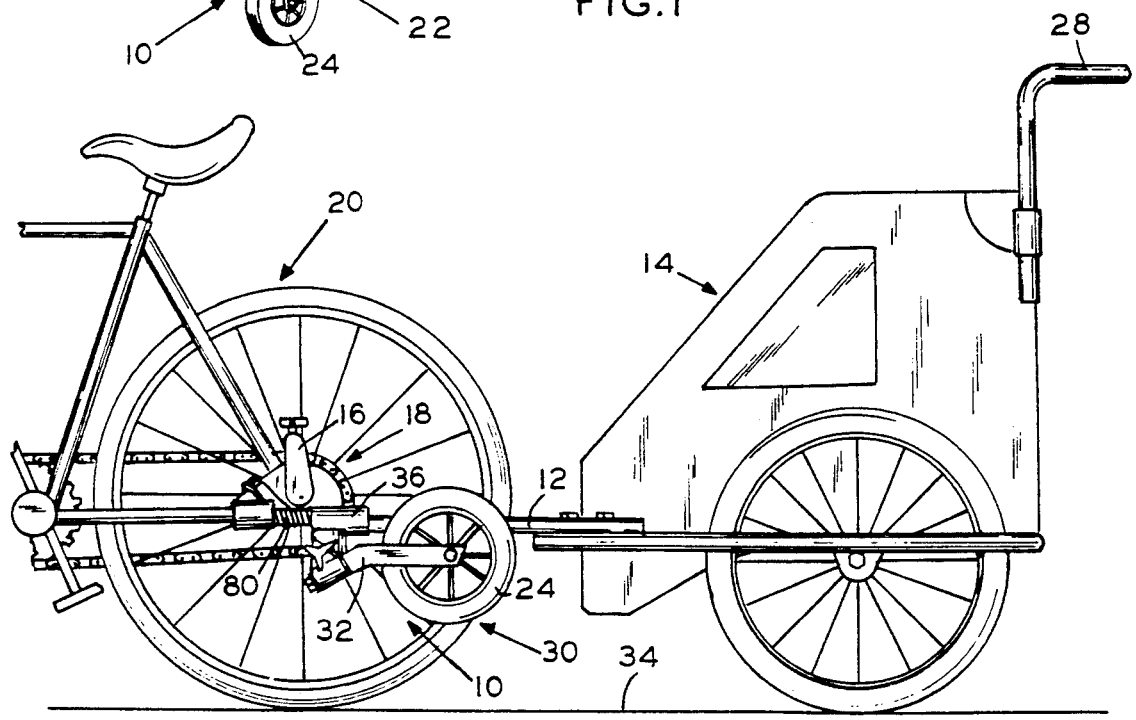

STROLLER WHEEL ASSEMBLY FOR BICYCLE TRAILER

BACKGROUND OF THE INVENTION

1. Field of the Invention

This invention involves a wheel assembly mounted upon the tongue of a bicycle trailer which allows conversion of the bicycle trailer into a stroller.

2. Description of the Prior Art

A conventional two-wheel bicycle trailer has a tongue which attaches to a bicycle, in many cases in the vicinity of the bicycle's rear axle. The applicants have determined that such a bicycle trailer may readily be converted to a three-wheel stroller by the addition of a pushing handle, a parking brake, and an appropriate front, third wheel.

Previous vehicles have been designed which are convertible between two and three wheels. U.S. Pat. No. 909,297 describes a utility cart frame having a coaster wheel which is removable to provide a rigid supporting leg. U.S. Pat. No. 3,841,663 discloses a retractable trailer tongue stand which is mounted to the trailer tongue by a slot and pivot connection wherein it may be manually locked in either a vertical or horizontal position. U.S. Pat. No. 5,064,209 discloses a combined trailer and wheel chair, towable behind a powered cart or pushable as a wheel chair, which uses a coaster-type small wheel on a forward transverse beam which is removable, as disclosed, or may be designed to be retractable.

SUMMARY OF THE INVENTION

The present invention involves a stroller wheel assembly for bicycle trailers which is mounted onto the bicycle trailer at the front portion of the tongue behind the trailer hitch. The wheel assembly, thus mounted, has two operating positions:

a. an "up" or bicycle trailer position wherein the wheel is pivoted upward and rearward and locked in this position, the forks holding the wheel being essentially horizontal, so that the wheel clears the ground during bicycle trailer operation; and b. a "down" or stroller position wherein the wheel is pivoted downward and forward and locked in this position, so that, with the trailer separated from the bicycle, the downward extending wheel forms a front or "third" wheel for stroller operation.

In the preferred embodiment a clamping member is fastened about the tongue of the bicycle trailer, normally immediately behind the hitch. From a downward extension of the clamping member, a boss, preferably in the shape of an equilateral triangle, extends transversely outward. Centrally fixed to and extending outwardly from the triangular boss is a threaded member.

A wheel support member includes a pivot member and a fork which supports the wheel and rotates axially upon a steerer spindle within the pivot member. The pivot member includes a triangular mating socket into which the triangular boss fits. The triangular socket of the pivot member is able to engage the triangular boss of the clamping member in any of three different positions, resulting in three possible orientations of the wheel with respect to the trailer tongue. In actual use, only two of the triangular positions are utilized, one with the wheel in the down position for stroller use and the other with the wheel in a rearward suspended position for bicycle trailer use.

The threaded member acts as an axis about which the pivot member may be rotated between the down, stroller position and the up, bicycle trailer position. A coil compression spring encloses the threaded member so as to be located between the triangular boss of the clamping member and the triangular socket of the pivot member, the spring thus biasing the boss out of the socket to facilitate relocation of the pivot member. The threaded member is inserted through an aperture formed in the center of the triangular socket of the pivot member. A threaded knob, which engages the threaded member from the opposing side of the pivot member, upon tightening, pulls the boss into the socket, thereby locking the wheel into either the down, stroller or up, trailer position.

An upwardly inclined "safety plate", attached to the front portion of the pivot member, serves to physically interfere with and deflect the hitch when the wheel is in the down, stroller position, thus preventing inadvertant use of the wheel in the down, stroller position while hitched to the bicycle.

BRIEF DESCRIPTION OF THE DRAWINGS

FIG. 1 illustrates a perspective view of the stroller wheel assembly, mounted upon a bicycle trailer tongue, in the down position for stroller operation.

FIG. 2 illustrates a side view of the stroller wheel assembly mounted upon a bicycle trailer tongue, in the up position for trailer operation.

DESCRIPTION OF THE PREFERRED EMBODIMENT

Figure 3:
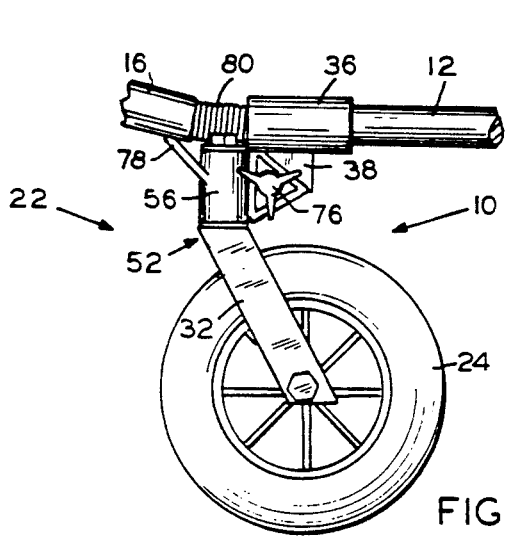
FIG. 3 illustrates a side view of the stroller wheel assembly in the down, stroller position.

Turning now to the drawings, there is shown in FIG. 1 the stroller wheel assembly 10 mounted upon the tongue 12 of a bicycle trailer 14 of the type which attaches, as seen in FIG. 2, by means of a hitch 16 proximate the rear axle 18 of a bicycle 20. The stroller wheel assembly 10 in FIG. 1 is illustrated in a down, stroller position 22 wherein the wheel 24 is pivoted downwards and locked in a position, so that, with lo the trailer 14 separated from the bicycle 20, the downward extending wheel 24 forms a front or "third" wheel for operation as a stroller. A pushing handle 28 and a parking brake (not shown) additionally may be added to the bicycle trailer 14 to facilitate its use as a stroller 26.

FIG. 2 illustrates the stroller wheel assembly 10 in an up, bicycle trailer position 30 wherein the wheel 24 has been pivoted upward and backward, and locked in this position, with the fork 32 holding the wheel 24 being essentially horizontal so that the wheel 24 clears the ground 34 during operation as a bicycle trailer 14.

Figure 7:
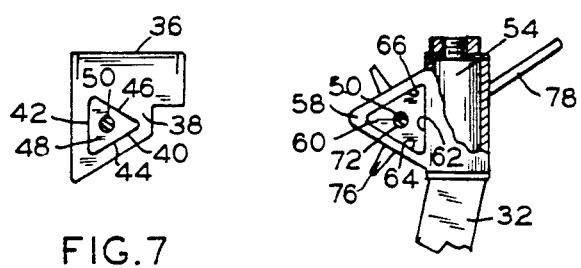
FIG. 7 illustrates the triangular boss on the clamp member, as seen at line 7—7 of FIG. 6.

The stroller wheel assembly 10 includes a clamping member 36 which is fastened about the tongue 12 of the trailer 14, normally immediately behind the hitch 16. From a downward extension 38 of the clamping member 36, a boss 40 extends transversely outward. While a number of designs of boss 40 will work, including those with a surface 48 in the shape of a regular polygon, the preferred shape of the boss 40, as best seen at FIG. 7 is in the general form of an equilateral triangle, with the side faces 42, 44, 46 being 120 degrees apart. Affixed to and extending outward from the center of the boss 40 is a threaded member 50.

Figure 8:
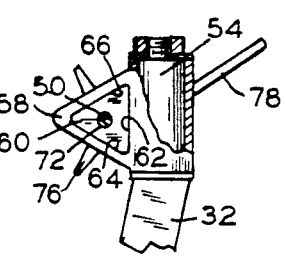
FIG. 8 illustrates the triangular socket on the pivot member when the wheel is in the down stroller position, as seen at line 8—8 of FIG. 6.
Figure 9:
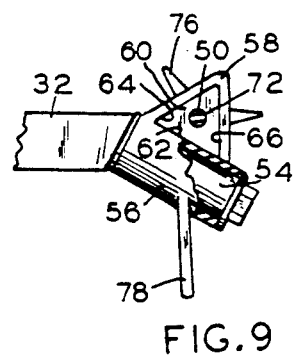
FIG. 9 illustrates the triangular socket on the pivot member when the pivot member has been rotated 120 degrees to move the wheel backwards and upwards to the up, trailer position.

A wheel support member 52 includes a pivot member 56 and a fork 32 which supports the wheel 24 and rotates 360-degrees upon a conventional steerer spindle 54 within the pivot member 56. The pivot member 56 includes a rearward extension 58 which contains a mating socket 60 of a shape and size corresponding to the boss 40. Thus, in the preferred embodiment, the socket 60 also is in the shape of an equilateral triangle, and has inner faces 62, 64, 66, as best seen in FIG. 8. Therefore, the pivot member 56 with its triangular socket 60 theoretically is able to engage the clamping member 36 in any of three different positions, each such position varying the location of the pivot member 56 120-degrees with respect to the clamping member 36 and thus with respect to the tongue 12 of the trailer 14. In actual use, however, only two of the triangular positions are utilized, one with the wheel 24 in the down, stroller position 22 and the other with the wheel 24 in the up, bicycle trailer position 30. In the down stroller position 22, as best seen in comparing FIG. 7 and FIG. 8, the faces 42, 44, and 46 of the triangular boss 40 of the clamping member 36 will lay adjacent, respectively, to faces 62, 64, and 66 of the triangular socket 60 of the pivot member 56. In the down, stroller position 22, the steerer spindle 54 is essentially vertical with the fork 32 angled rearward approximately thirty degrees, as is conventionally desirable in the use of a freely rotating coaster-type wheel 24. In the up, bicycle trailer position 30, as best seen in comparing FIG. 7 and FIG. 9, where in FIG. 9 the pivot member 56 has been rotated rearward 120-degrees from its down, stroller position 22, the faces 42, 44, and 46, of the triangular boss 40 now will lay adjacent, respectively, to faces 66, 62, and 64, of the triangular socket 60 of the pivot member 56. In the up, bicycle trailer position 30, the steerer spindle 54 is inclined rearwardly upward, and the forks 32, having rotated 180-degrees at the steerer spindle 54, are now essentially horizontal, with the wheel 24 extending rearwardly well above the ground surface 34.

Figure 4:
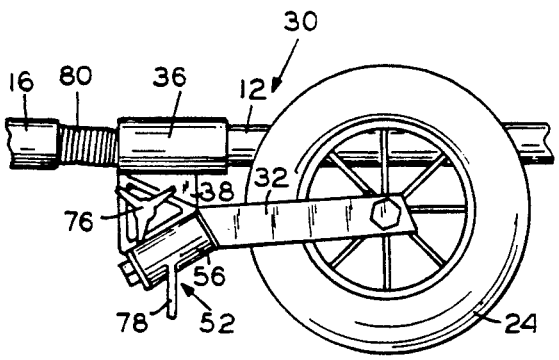
FIG. 4 illustrates a side view of the stroller wheel assembly in the up, trailer position.
Figure 5:
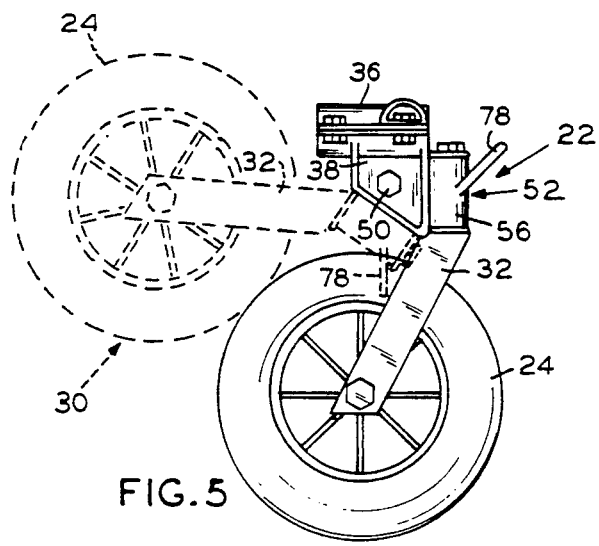
FIG. 5 illustrates an opposing side view of the stroller wheel assembly in the down, stroller position, with the up, trailer position shown in dashed lines.

FIGS. 3, 4, and 5 also illustrate the relative positions of the wheel 24, forks 32, pivot member 56 and clamping member 36 in the two positions 22 and 30.

Figure 6:
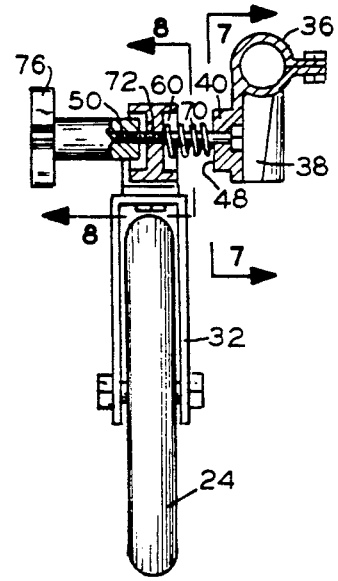
FIG. 6 illustrates a back view of the stroller wheel assembly, wherein the knob is loosened to allow pivotal movement between the down, stroller position and the up, trailer position.

The threaded member 50 acts as an axis about which the pivot member 56 is rotated between the down, stroller position 22 and the up, bicycle trailer position 30. A coil compression spring 70, as seen in FIG. 6, is placed about the threaded member 50 so as to be located between the triangular boss 40 of the clamping member 36 and the triangular socket 60 of the pivot member 56, the spring 70 thus biasing the boss 40 out of the socket 60. The threaded member 50 having been inserted through an aperture 72 formed at the center of the triangular socket 60, a threaded knob 76 engages the threaded member 50 as it extends through the pivot member 56. Rotational tightening of the knob 76 pulls the triangular boss 40 of the clamping member 36 into the properly rotated triangular socket 60 of the pivot member 56 so as to lock the pivot member 56, and wheel 24, into either the down, stroller position 22 or the up, bicycle trailer position 30. FIG. 6 illustrates the stroller wheel assembly 10 in the down, stroller position 22 where the knob 76 has been loosened so as to allow the spring 70 to separate the boss 40 from the socket 60 and readily allow rotation of the pivot member 56 about the threaded member 50 to the desired position before tightening of the knob 76 to engage the boss 40 with the socket 60.

An inclined safety plate 78 extends outwardly from the pivot member 56. The safety plate is formed to reach out, when the pivot member 56 is in the down, stroller position 22, so as to physically interfere with, and deflect out of a linear position, the hitch 16. (See, for example, the hitch disclosed in U.S. Pat. No. 4,721,320.) Such interference with the hitch 16 prevents inadvertant location of the wheel 24 in the down, stroller position 22 when the trailer 14 is hitched to the bicycle 20, or conversely, prevents the hitching of the trailer 14 to the bicycle 20 when the wheel 24 is in the down, stroller position 22. The effect of the safety plate 78, with the wheel 24 in the down, stroller position 22, is shown in FIG. 3 where the hitch 16 is deflected upwards at its flexible attachment 80, a coil spring as illustrated. FIG. 4 shows the wheel 24 in the up, bicycle trailer position 30, where the safety plate 78 in the rotation of the pivot member 56, now extends downward, well clear of the hitch 16 when the bicycle trailer 14 is being towed.

It is thought that the stroller wheel assembly 10 for bicycle trailer 14 of the present invention and its many attendant advantages will be understood from the foregoing description and that it will be apparent that various changes in form, construction and arrangement of the parts thereof may be made without departing from the spirit and scope of the invention or sacrificing all of its material advantages, the form hereinbefore described being merely an exemplary embodiment thereof.

I claim:

1. A stroller wheel assembly for bicycle trailers, comprising:
   a. a clamping member;
   b. a pivot member which supports a wheel; and
   c. means for selective attachment of said pivot member to said clamping member in a plurality of fixed positions of said pivot member relative to said clamping member, which means include a boss and a mating socket which are formed, when mutually engaged, to provide a plurality of fixed positions between said pivot member and said clamping member;
   d. said boss being formed upon said clamping member and said mating socket being formed in said pivot member.

2. A stroller wheel assembly for bicycle trailers, comprising:
   a. a clamping member;
   b. a pivot member which supports a wheel; and
   c. means for selective attachment of said pivot member to said clamping member in a plurality of fixed positions of said pivot member relative to said clamping member, which means include a boss and a mating socket which are formed, when mutually engaged, to provide a plurality of fixed positions between said pivot member and said clamping member;

d. said boss and said mating socket being formed in the shape of an equilateral triangle.

3. A stroller wheel assembly for bicycle trailers, comprising:
   a. a clamping member;
   b. a pivot member which supports a wheel;
   c. means for selective attachment of said pivot member to said clamping member in a plurality of fixed positions of said pivot member relative to said clamping member, which means include a boss and a mating socket which are formed, when mutually engaged, to provide a plurality of fixed positions between said pivot member and said clamping member; and
   d. a connecting member extending between said pivot member and said clamping member to releasably hold said boss and mating socket in engagement;
   e. said boss having a center and said mating socket having a center, said connecting member extending between said centers of said boss and said mating socket.

4. A stroller wheel assembly, as recited in claim 3, where said connecting member additionally is formed to be an axis of rotation for said pivot member upon said clamping member.

5. A stroller wheel assembly for bicycle trailers, comprising:
   a. a clamping member;
   b. a pivot member which supports a wheel;
   c. means for selective attachment of said pivot member to said clamping member in a plurality of fixed positions of said pivot member relative to said clamping member; said plurality of fixed positions of said pivot member relative to said clamping member including:
      (1) an up, bicycle trailer position wherein the wheel is pivoted rearward to, and locked in, an upward position, so that the wheel clears the ground during bicycle trailer operations; and
      (2) a down, stroller position wherein the wheel is pivoted forward to, and locked in, a downward position, so that the downward extending wheel forms a front wheel for stroller operation; and
   d. an inclined plate member, attached to said pivot member, extending upwardly and forwardly to physically interfere with, and deflect, a trailer hitch when the wheel is in said down, stroller position, thus preventing inadvertant use of the wheel in the down, stroller position during bicycle trailer operations.

6. A stroller wheel assembly for bicycle trailers comprising:
   a. a clamping member;
   b. said clamping member including a transversely extending equilateral triangular boss;
   c. a pivot member which supports a wheel;
   d. said pivot member including a triangular socket into which said triangular boss engages, so as to provide a plurality of fixed positions for said pivot member and supported wheel relative to said clamping member;
   e. a threaded member centrally fixed and extending transversely from said equilateral triangular boss; said triangular socket having an aperture formed centrally therein to accomodate said threaded member of said clamping member;
   f. said threaded member having been inserted to extend through the aperture in said triangular socket of said pivot member, a threaded knob engaging said threaded member so that, upon tightening of said knob, said triangular boss is inserted into said triangular socket in a fixed position, thereby locking the wheel, through the pivot member, at a fixed orientation to said clamping member.

7. A stroller wheel assembly, as recited in claim 6, wherein said plurality of positions for said pivot member and attached fork and wheel relative to said clamping member include:
   a. an up, bicycle trailer position wherein the wheel is pivoted rearward to, and locked in, an upward position, so that the wheel clears the ground during bicycle trailer operation; and
   b. a down, stroller position wherein the wheel is pivoted forward to, and locked in, a downward position, the downward extending wheel forming a front wheel for stroller operation.

8. A stroller wheel assembly, as recited in claim 6, wherein, additionally, an inclined plate member, attached to said pivot member, extends upwardly and forwardly to physically interfere with and deflect a trailer hitch when the wheel is in the down, stroller position, thus preventing inadvertant use of the wheel in the down, stroller position during bicycle trailer operation.

9. A stroller wheel assembly, as recited in claim 6, wherein, additionally, there is included a coil compression spring surrounding said threaded member so as to be located between the triangular boss of the clamping member and the triangular socket of the pivot member, the spring biasing the boss out of the socket.

10. A stroller wheel assembly for bicycle trailers, comprising:
    a. a clamping member;
    b. said clamping member including a transversely extending equilateral triangular boss;
    c. a threaded member centrally fixed and extending transversely from said equilateral triangular boss;
    d. a pivot member which supports a wheel;
    e. said pivot member including a triangular socket into which said triangular boss engages, so as to provide a plurality of fixed positions for said pivot member and supported wheel relative to said clamping member, which positions include: an up, bicycle trailer position wherein the wheel is pivoted rearward to, and locked in, an upward position, so that the wheel clears the ground during bicycle trailer operation; and a down, stroller position wherein the wheel is pivoted forward to, and locked, in a downward position, the downward extending wheel forming a front wheel for stroller operation; said triangular socket of said pivot member having an aperture formed centrally therein to accomodate said threaded member of said clamping member;
    f. a coil compression spring surrounding said threaded member so as to be located between the triangular boss of the clamping member and the triangular socket of the pivot member, the spring biasing the boss out of the socket;

g. said threaded member having been inserted to extend through said aperture in said triangular socket of said pivot member, a threaded knob engaging said threaded member so that, upon tightening of said knob, said triangular boss is inserted into said triangular socket in a fixed position, thereby locking the wheel, through the pivot member, at a fixed orientation to said clamping member; and h. an inclined plate member, attached to said pivot member, extending upwardly and forwardly to physically interfere with a trailer hitch when the wheel is in the down, stroller position, thus preventing inadvertant use of the wheel in the down, stroller position during bicycle trailer operation.

11. A stroller wheel assembly for bicycle trailers, comprising:

a. a clamping member;

b. a pivot member which supports a wheel;

c. means for selective attachment of said pivot member to said clamping member in a plurality of fixed positions of said pivot member relative to said clamping member which means include a boss and a mating socket which are formed, when mutually engaged, to provide a plurality of fixed positions between said pivot member and said clamping member; and d. a spring, acting between said clamping member and said pivot member, which biases said boss out of engagement with said socket to facilitate movement between said plurality of fixed positions.

* * * * *